United States Patent
Yang et al.

(10) Patent No.: US 10,074,298 B2
(45) Date of Patent: Sep. 11, 2018

(54) IMAGE PROCESSING METHOD AND DISPLAY DEVICE

(71) Applicant: Novatek Microelectronics Corp., Hsinchu (TW)

(72) Inventors: Hsueh-Yen Yang, Taoyuan (TW); Hua-Gang Chang, Hsinchu County (TW); Chun-Chieh Lin, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 106 days.

(21) Appl. No.: 15/408,426

(22) Filed: Jan. 18, 2017

(65) Prior Publication Data

US 2018/0204498 A1    Jul. 19, 2018

(51) Int. Cl.
  *G09G 3/30* (2006.01)
  *G09G 3/20* (2006.01)

(52) U.S. Cl.
  CPC ... *G09G 3/2003* (2013.01); *G09G 2320/0626* (2013.01); *G09G 2320/0666* (2013.01)

(58) Field of Classification Search
  CPC ......... G09G 2340/125; G09G 2360/10; G09G 3/12–3/14
  See application file for complete search history.

(56) References Cited

U.S. PATENT DOCUMENTS

| | | | | |
|---|---|---|---|---|
| 2001/0017630 A1* | 8/2001 | Sakashita | ............... | G06F 3/14 345/635 |
| 2003/0090488 A1* | 5/2003 | Yoo | ............... | G09G 3/2007 345/473 |
| 2011/0298818 A1* | 12/2011 | Mori | ............... | G09G 3/3208 345/589 |
| 2016/0171931 A1 | 6/2016 | Liu et al. | | |

OTHER PUBLICATIONS

Spindler et al., "System considerations for RGBW OLED displays," Journal of the Society for Information Display, vol. 14, Issue 1, Jan. 2006, pp. 37-48.

* cited by examiner

*Primary Examiner* — Sanghyuk Park
(74) *Attorney, Agent, or Firm* — JCIPRNET (57) ABSTRACT

An image processing method and a display device thereof are provided. The method is adapted to a display panel with a display area. The image processing method includes the following steps. Whether original images to be displayed on a plurality of sub-areas of the display area are still is analyzed and determined. When the original image in a current sub-area is still, a time length of the original image being still is recorded. The current sub-area is one of the sub-areas. Processing levels corresponding to a plurality of image processing schemes are determined based on the time length. Overall or partial luminance (luma) of the original image in the current sub-area is gradually reduced by the image processing schemes with the determined processing levels, and a corresponding luma-reduced image is displayed on the current sub-area.

19 Claims, 9 Drawing Sheets

IMAGE PROCESSING METHOD AND DISPLAY DEVICE

BACKGROUND

Field of the Invention

The invention is directed to an image processing technique and more particularly, an image processing method and a display device thereof capable of extending a lifetime of a display panel.

Description of Related Art

A solid state light source (e.g., a light-emitting diode (LED), an organic light-emitting diode (OLED), etc.), in comparison with a fluorescent lamp or an incandescent lamp of the related art, has advantages, such as small volume, long lifetime, high reliability and so on, thus, has become the focus of development of the optoelectronic industry and widely applied in the lighting market and display devices in a variety of sizes. The OLED is self-luminous and does not need any backlight source, such that an OLED film has a thin characteristic to achieve light transparency and a better development vision than the LED.

As an OLED element is used for a long time, or driven by high luminance, material deterioration occurs to the OLED element, which leads to reduced emitting efficiency, decreased life cycle of a display panel, and occurrence of defects, such as image sticking, on the display panel. According to an experiment, the lifetime of the OLED element relates to a current amount (which is referred to as current density herein) of an emitting area per unit. For example, when the OLED element is driven by a current density of 10 mA/cm$^2$, an average light-emitting intensity of the OLED element will become half of an original light-emitting intensity after about 40000 hours. When the OLED element is driven by a current density of 20 mA/cm$^2$, the average light-emitting intensity of the OLED element will become half of an original light-emitting intensity after about 20000 hours. Namely, as the current density increases, a non-linear drop will appear in a relation graph of the average light-emitting intensity of the OLED element with respect to time. Additionally, recent displays tends to be provided with high resolution to present delicate images. As a result, a light-emitting area of the OLED element for presenting each pixel is gradually reduced, such that the current density of the OLED element is increased, which also leads to reduction of the lifetime of the OLED element.

Accordingly, how to mitigate the decay speed of the solid state light source, so as to increase the lifespan of the display panel has become a goal of technological progress in the solid state light source to be achieved by manufacturers.

SUMMARY

The invention provides an image processing method and a display device capable of gradually reducing luminance of light emitting elements (e.g., OLED elements) by a plurality of image processing schemes, so as to mitigate a decay speed of the luminance of the light emitting elements to extend lifetimes of the light emitting elements and the display panel using light emitting elements.

An image processing method of the invention is adapted to a display panel with a display area. The image processing method includes the following steps. A plurality of original images to be displayed on a plurality of sub-areas in the display area are analyzed, and whether the original image corresponding to each of the sub-areas is still is determined. When the original image in a current sub-area is still, a time length of the original image being still is recorded. The current sub-area is one of the sub-areas. Processing levels corresponding to a plurality of image processing schemes are determined based on the time length. Overall or partial luminance (luma) of the original image in the current sub-area is gradually reduced by the image processing and a corresponding luma-reduced image is displayed on the current sub-area.

A display device of the invention includes a display panel, a panel driver and a display controller. The display panel includes a display area. The panel driver is coupled to and drives the display panel. The display controller is coupled to the panel driver. The display controller analyzes a plurality of original images to be displayed on a plurality of sub-areas in the display area, and determines whether the original image corresponding to each of the sub-areas is still. When the original image in a current sub-area is still, the display controller records a time length of the original image being still. The current sub-area is one of the sub-areas. The display controller determines processing levels corresponding to a plurality of image processing schemes based on the time length, gradually reduces overall or partial luminance (luma) of the original image in the current sub-area by the image processing schemes with the determined processing levels, and displays the corresponding luma-reduced image on the current sub-area.

To sum up, in the image processing method and the display device using the same provided by the invention, the processing levels corresponding to a plurality of image processing schemes can be determined according to whether each image on the display area is still or the bending degree of the flexible display area, and the luminance for driving a light emitting element (e.g., a blue OLED element) in the display panel can be reduced by the image processing schemes with the determined processing levels. If the luminance of the still image decreases as the duration in which the image is maintained still increases, it is difficult for the user to perceive. Moreover, in the scenario of the flexible display panel, the user does not especially pay attention to the image displayed on the display area having an excessively large bending degree (or referred to as bending angle). Thus, the image processing method of the invention intends to gradually reduce the luminance according to the duration in which the image is maintained still or the bending degree of the display area which can prevent the user from perceiving the reduction of the luminance of the image as much as possible. Thereby, the current density of the light emitting elements on the display panel can be effectively reduced, so as to mitigate a decay speed of the luminance of the light emitting elements and extend lifetimes of the light emitting elements and the display panel using light emitting elements.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
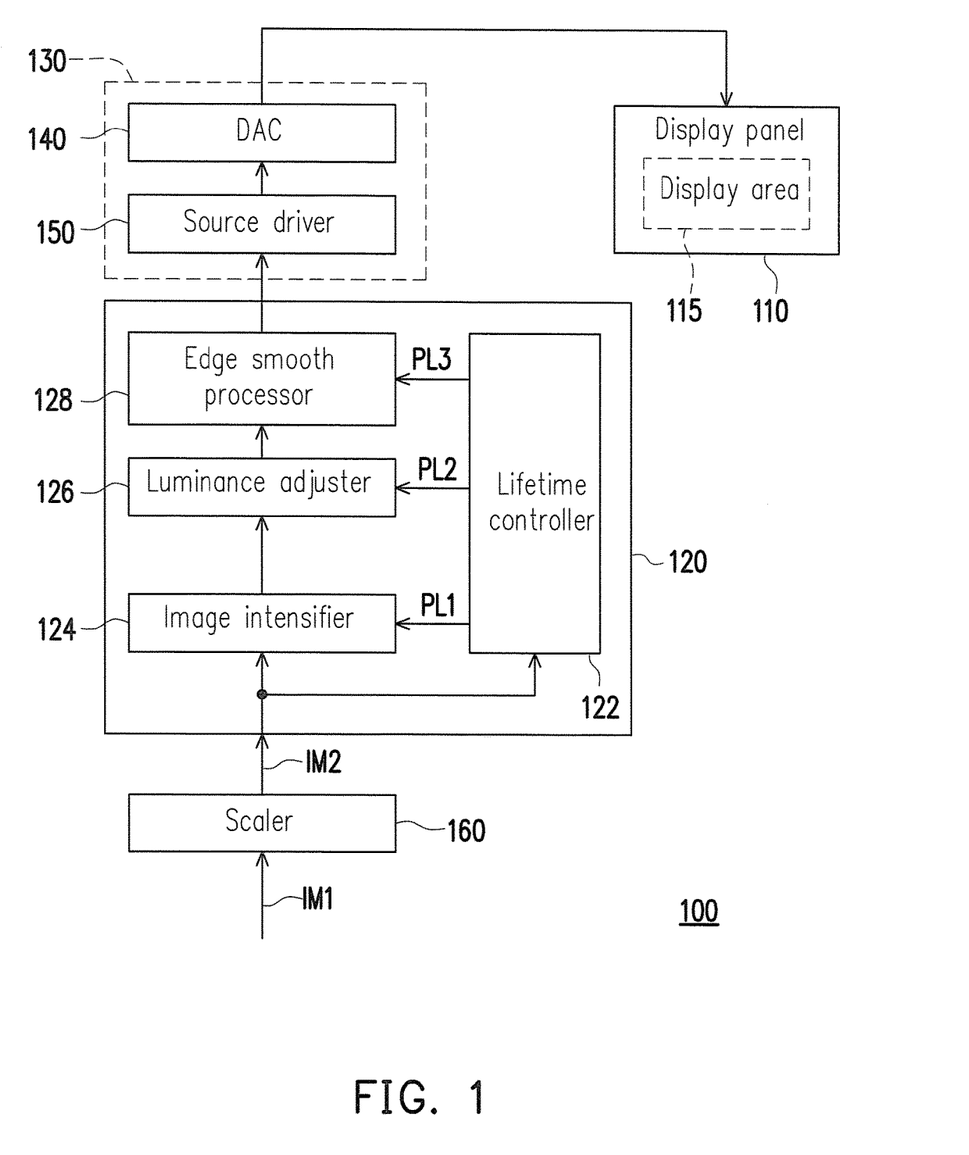
FIG. 1 is a functional block diagram of a display device according to a first embodiment of the invention.

FIG. 1 is a functional block diagram of a display device 100 according to a first embodiment of the invention. The display device 100 is a consumer electronic device, such as a cell phone, a tablet computer and a notebook computer, or a home appliance provided with a display screen, such as a television. Referring to FIG. 1, the display device 100 includes a display panel 110, a panel driver 130 and a display controller 120. In the present embodiment, the panel driver 130 may include a digital-to-analog converter (DAC) 140 and a source driver 150. In some of the embodiments, the panel driver 130 may also include a timing controller, or the function of the timing controller may be integrated in the display controller 120 of the display apparatus 100. The display panel 100 may be composed of a solid state light source, for example, a light-emitting diode (LED) element or an organic light emitting diode (OLED) element. The display panel 110 may be a non-flexible display panel or a flexible display panel.

The display device 100 may also include a scaler 160. When the display device 100 obtains input image information IM1, the scaler 160 converts the input image information IM1 into image information IM2 conforming to a resolution of the display panel 110 or a form readable by the display controller 120, and transmits the converted image information to the display controller 120. If the input image information IM1 conforms to the form readable by the display controller 120, the scaler 160 may be omitted from the display device 100 of the present embodiment, and the display device 100 may directly transmit the input image information IM1 to a receiving terminal of the display controller 120.

The display controller 120 may include a lifetime controller 122 and image processors corresponding to a plurality of image processing schemes. The image processors described in the embodiments of the invention may be implemented by using application-specific integrated circuits (ASICs) or software modules, and implementation manners of the lifetime controller 122 and the image processors are not limited in the invention. In the present embodiment, the image processors at least includes an image intensifier 124, a luminance adjuster 126 and an edge smooth processor 128, and a person applying the present embodiment may also embody the invention by adopting related image processors or image processing schemes. The display controller 120 performs the processing operations described in the embodiments of the invention on the received image information IM2, and transmits information with respect to each pixel to the panel driver (for example, the source driver 150 and the DAC 140), so as to drive each light emitting element on the display panel 110.

Figure 2:
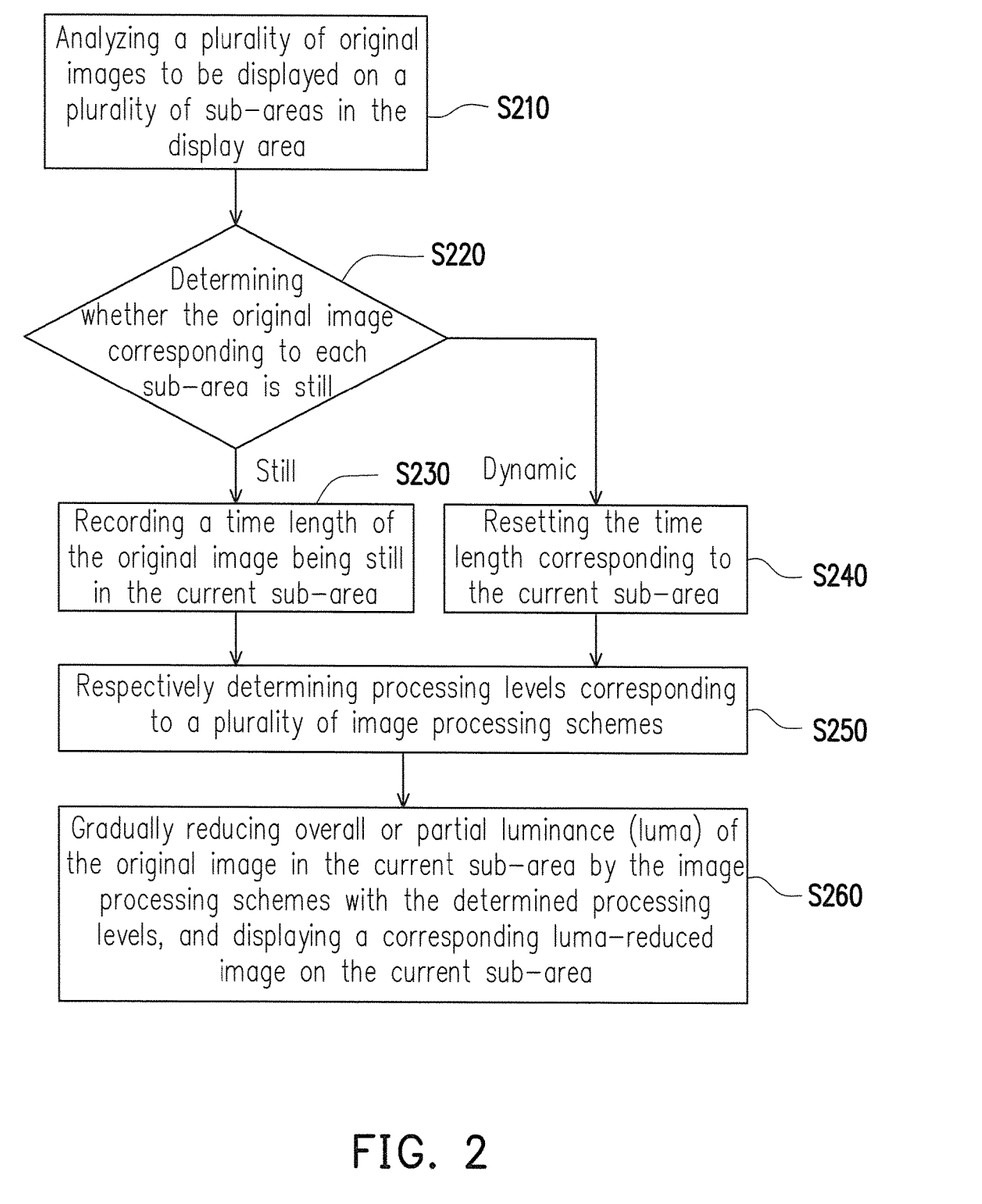
FIG. 2 is a flowchart of an image processing method according to the first embodiment of the invention.

Please refer to both FIG. 1 and FIG. 2 for the processing flow of the display controller 120 and an image processing method of the invention. FIG. 2 is a flowchart of an image processing method according to the first embodiment of the invention. The image processing method illustrated in FIG. 2 is adapted to the display device 100 including the display panel 110 with a display area. Referring to both FIG. 1 and FIG. 2, in step S210, the display controller 120 receives the image information IM2 to obtain an image to be displayed on a display area 115, and analyzes a plurality of original images to be displayed on a plurality of sub-areas in the display area 115.

Figure 3:
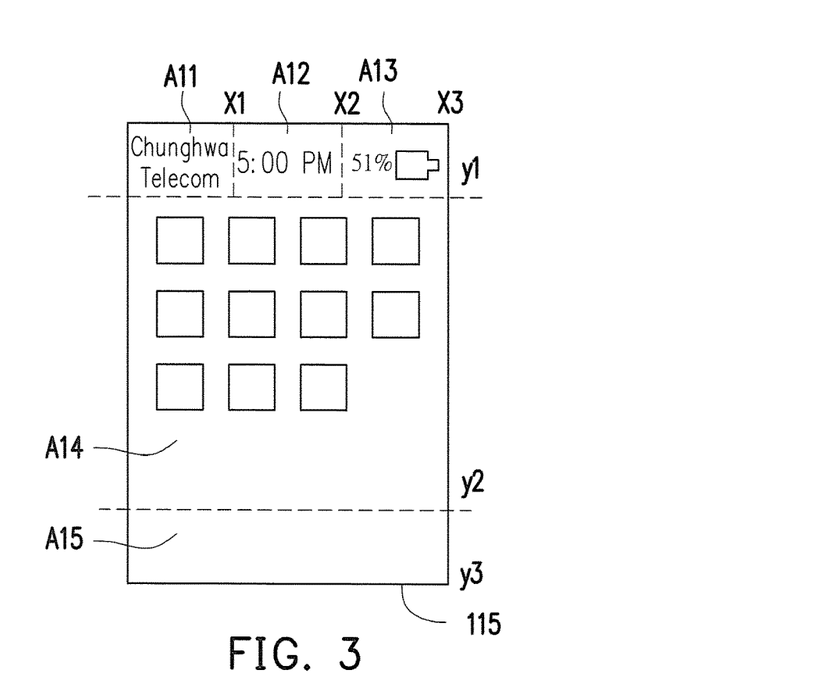
FIG. 3 to FIG. 4 are schematic diagrams of dividing the display area into a plurality of sub-areas according to different embodiments.
Figure 4:
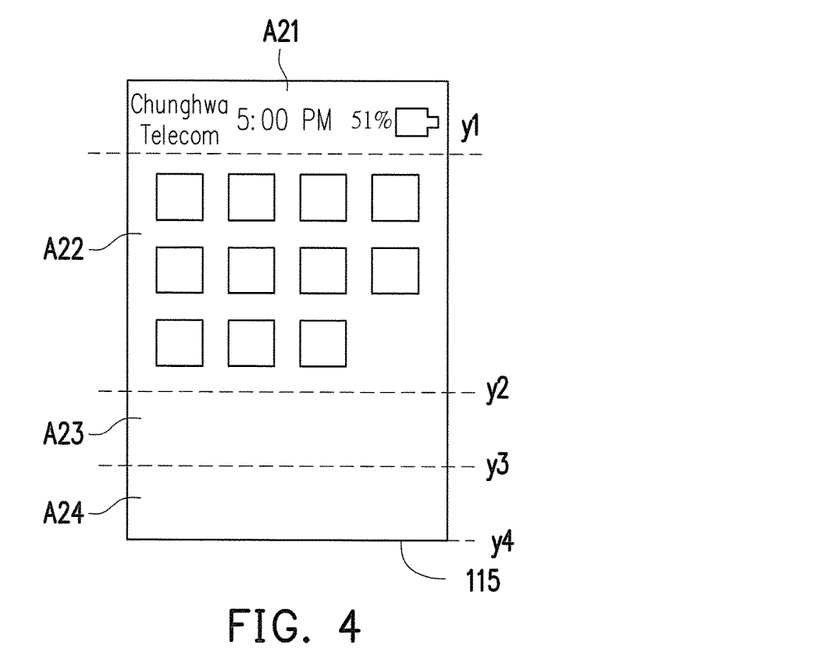

The display controller 120 may divide the display area 115 into a plurality of sub-areas according to user definition or a predetermined condition. FIG. 3 to FIG. 4 are schematic diagrams of dividing the display area 115 into a plurality of sub-areas according to different embodiments. Referring to FIG. 3 and FIG. 4, the display area 115 illustrated in FIG. 3 may be divided into 5 sub-areas, i.e., A11 to A15, while the display area 115 illustrated in FIG. 4 may be divided into 4 sub-areas, i.e., A21 to A24. The sub-areas A11 to A15 and A21 to A24 may be defined based on coordinates (e.g., x1 to x3, and y1 to y4) on the X-axis and the Y-axis, and may be previously stored in a storage device corresponding to the display controller 120. In the present embodiment, the sub-areas A11 to A15 and A21 to A24 may be divided according to functions presented in different positions of the display area 115. For example, the sub-area A11 is configured to display text description of a telecommunication provider, the sub-area A12 is configured to display time, the sub-area A13 is configured to display electric quantity of the display device 100, and the sub-area A21 is configured to display a status field of the display device 100. The sub-areas A14 and A23 are configured to display various application (APP) icons, and the sub-areas A15 and A24 are configured to display frequently used APPs.

The purpose of dividing the sub-areas in the invention lies in separating the sub-areas that are frequently used to display static images from others, so as to reduce luminance of the images displayed therein to extend lifetime of the light emitting elements. Thus, the person applying the present embodiment may divide the display area 115 into a plurality of sub-areas based on demands in a manner like that illustrated in FIG. 3 or FIG. 4, or a self-defined dividing manner, and the invention should not be limited to the dividing manners illustrated in FIG. 4 and FIG. 4. In order to describe the invention more clearly, the sub-area A14 illustrated in FIG. 3 is taken as an example of a current sub-area for describing each step below. It should be understood that the current sub-area may be any one of the sub-areas A11 to A15 illustrated in FIG. 3 (or FIG. 4) being processed.

Referring back to FIG. 1 and FIG. 2, in step S220, the lifetime controller 122 of the display controller 120 determines whether the original image corresponding to each sub-area is still. It is difficult for a user to perceive if luminance of the still image slightly decreases as a duration in which the image is maintained still increases. Thus, when the lifetime controller 122 determines the original image in the current sub-area (e.g., the sub-area A14) as still, i.e., the flow enters step S230 from step S220, the lifetime controller 122 records a time length (which refers to as a time length T14, for example) of the original image being still in the current sub-area A14. In the embodiments of the invention, when each frame of the original image in the current sub-area A14 is determined as still by the lifetime controller 122, the value of the time length T14 is added by 1. By contrast, when the lifetime controller 122 determines the original image in the current sub-area A14 as not still, i.e., the flow enters step S240 from step S220, the lifetime controller 122 resets the time length T14 corresponding to the current sub-area A14 (i.e., returns the value of the time length T14 to 0).

In step S250, the lifetime controller 122 respectively determines processing levels PL1 to PL3 corresponding to image processing schemes for the image processors (e.g., the image intensifier 124, the luminance adjuster 126 and the edge smooth processor 128) based on the time length T14 recorded in step S230 or step S240. In step S260, the image processors gradually reduce overall or partial luminance (luma) of the original image in the current sub-area A14 by the determined image processing schemes with the determined processing levels PL1 to PL3. Descriptions with respect to the time length (e.g., the time length T14 corresponding to the current sub-area A14), each image processor, relation between the image processing schemes corresponding to the image processors and the processing levels PL1 to PL3 thereof will set forth in detail below.

The image intensifier 124 of the present embodiment may process image information by a monochromatic filtering algorithm (e.g., a blue-light filter algorithm). A blue OLED is a main light emitting element of the OLED display panel 110. Among light emitting elements, the blue OLED has poorer light-emitting efficiency than other OLEDs in other colors, and therefore, a greater current is required for driving the blue OLED. However, the greater driving current leads to reduced average lifetime of the blue OLED element. Thus, the image intensifier 124 is capable of not only intensifying the image colors, but also mitigating decay of the blue OLED with poor reliability by reducing the luminance of the blue OLED through the blue-light filter algorithm. Thus, the lifetime controller 122 of the invention determines a luminance value corresponding to a first color (e.g., the blue color) in the still original image reduced by the monochromatic filtering algorithm to serve as the processing level PL1 according to the time length T14. In other words, as the value of the time length T14 increases, the lifetime controller 122 controls the image intensifier 124 to gradually reduce the luminance of the blue OLED in the image, to avoid being perceived or discovered by human eyes. The person applying the present embodiment may also replace the blue OLED with an OLED in another color or another type of monochromatic light emitting element, but the invention is not limited thereto.

The luminance adjuster 126 of the present embodiment may process image information by a luminance reduction algorithm. The luminance adjuster 126 reduces the luminance of the overall image in each sub-area. The lifetime controller 122 of the invention determines a luminance value corresponding to the current sub-area reduced by the luminance reduction algorithm to serve as the processing level PL2 according to the time length. As the time length T14 increases, the luminance value is reduced more by the luminance adjuster 126 under the control of the lifetime controller 122. For example, when the value of the processing level PL2 is 0, the reduced luminance value is 0 (i.e., the luminance of the image in the sub-area A14 is 100%); when the value of the processing level PL2 is 1, the reduced luminance value is 10% (i.e., the luminance of the image in the sub-area A14 is 90%); and when the value of the processing level PL2 is respectively 2, 3 or 4, the reduced luminance value is respectively 20%, 30% or 40% (i.e., the luminance of the image in the sub-area A14 is 80%, 70% or 60%). For instance, when the time length T14 of the image in the current sub-area being still is more than 6 seconds, and the image is 100% white, the overall luminance of the light emitting element is gradually reduced from 94 nits to 55 nits; and when the image is 49% white, the luminance of the light emitting element is gradually reduced from 156 nits to 56.35 nits.

Figure 5:
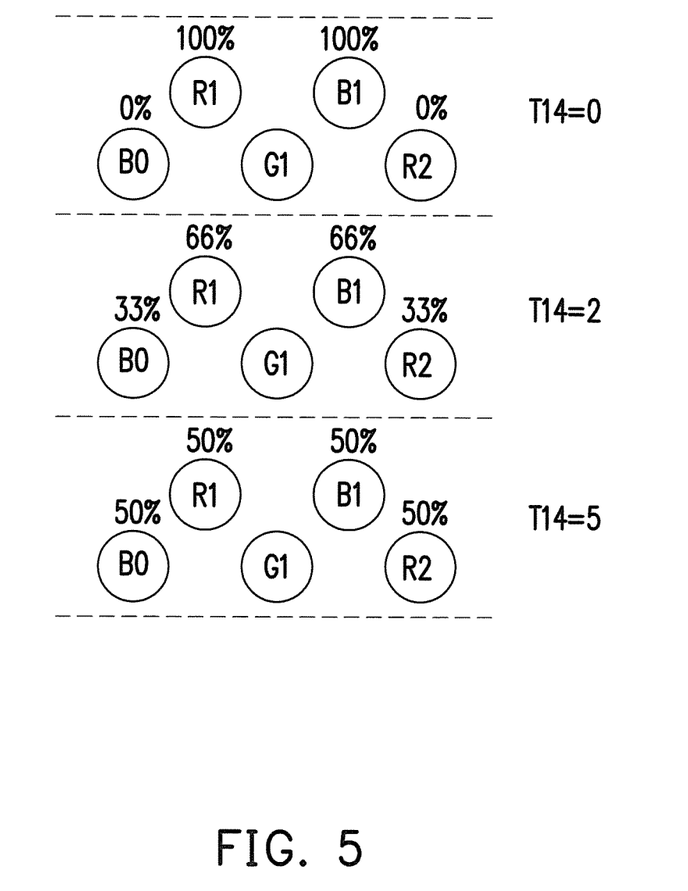
FIG. 5 is a schematic diagram illustrating an arrangement of a plurality of light emitting elements/sub-pixels.

The edge smooth processor 128 of the present embodiment may process image information by an edge smooth algorithm. Referring to FIG. 5, FIG. 5 is a schematic diagram illustrating an arrangement of a plurality of light emitting elements/sub-pixels. It is assumed herein that a green OLED element G1 is a sub-pixel located in the center, and blue OLED elements B0 and B1 and red OLED elements R1 and R2 are adjacent sub-pixels of the sub-pixel G1. In the edge smooth algorithm, luminance of the sub-pixel G1 located in the center may be diffused/spread to the adjacent sub-pixels/light emitting elements R1 and B1 by means of an arrangement manner of each light emitting element in the display panel 110 and the adjacency relation among the light emitting elements, and luminance of the sub-pixels R1 and B1 may be diffused/spread to the adjacent sub-pixels/light emitting elements B0 and R2. Namely, the lifetime controller 122 may determine a luma-reduction degree of the adjacent sub-pixels next to the sub-pixel G1 reduced by the edge smooth algorithm to serve as the processing level PL3 according to the time length T14. For example, when the time length T14 is 0, the luminance of sub-pixels G1, R1 and B1 is 100%, the luminance of sub-pixels B0 and R2 is 100%. When the time length T14 is 2 seconds, the lifetime controller 122 controls the luminance of the sub-pixel G1 to maintain in 100% by the edge smooth algorithm based on the processing level PL3, but the luminance of the adjacent sub-pixels B1 and R1 is set from 100% to 66%, the luminance of the adjacent sub-pixels B0 and R2 is set from 0% to 33%. In this way, a diffusion ratio of the sub-pixel G1 diffusing/spreading the luminance thereof to the surrounding adjacent sub-pixels (i.e., sub-pixels R1 and B1) is 33%. When the time length T14 is 5 seconds, the lifetime controller 122 controls the luminance of the sub-pixel G1 to maintain in 100% by the edge smooth algorithm based on the processing level PL3, but the luminance of the adjacent sub-pixels B1 and R1 is set from 66% to 50%, the luminance of the adjacent sub-pixels B0 and R2 is set from 33% to 50%. In this way, the diffusion ratio of the sub-pixel G1 diffusing/spreading the luminance thereof to the surrounding adjacent sub-pixels is 50%. In the present embodiment, for avoiding reducing the luminance of the sub-pixel by the edge smooth algorithm, it is assumed herein that the diffusion ratio of the sub-pixel G1 diffusing the luminance thereof to the adjacent sub-pixels is less than or equal to 50%, and is unpreferably more than 50%, or otherwise, the image luminance is overly low, which is easily perceived by the user. In other words, the luminance of the sub-pixels B0 and R2 is gradually increased from 0% at time length T14=0, 33% at time length T14=2, to 50% at time length T14=5.

Detailed flow of "determining whether the original image corresponding to each sub-area is still" in step S220 in FIG. 2 will be described hereinafter. The image information IM2 received by the display controller 120 may reach 60 to 120 frames per second, and whether the original image corresponding to each sub-area is still needs to be determined by a faster algorithm. In the embodiments of the invention, whether the image corresponding to each sub-area is still may be determined by a "cyclic redundancy check (CRC) algorithm" or an "adjacent block luminance averaging algorithm", so as to reduce computation burden of the display controller 120.

Figure 6:
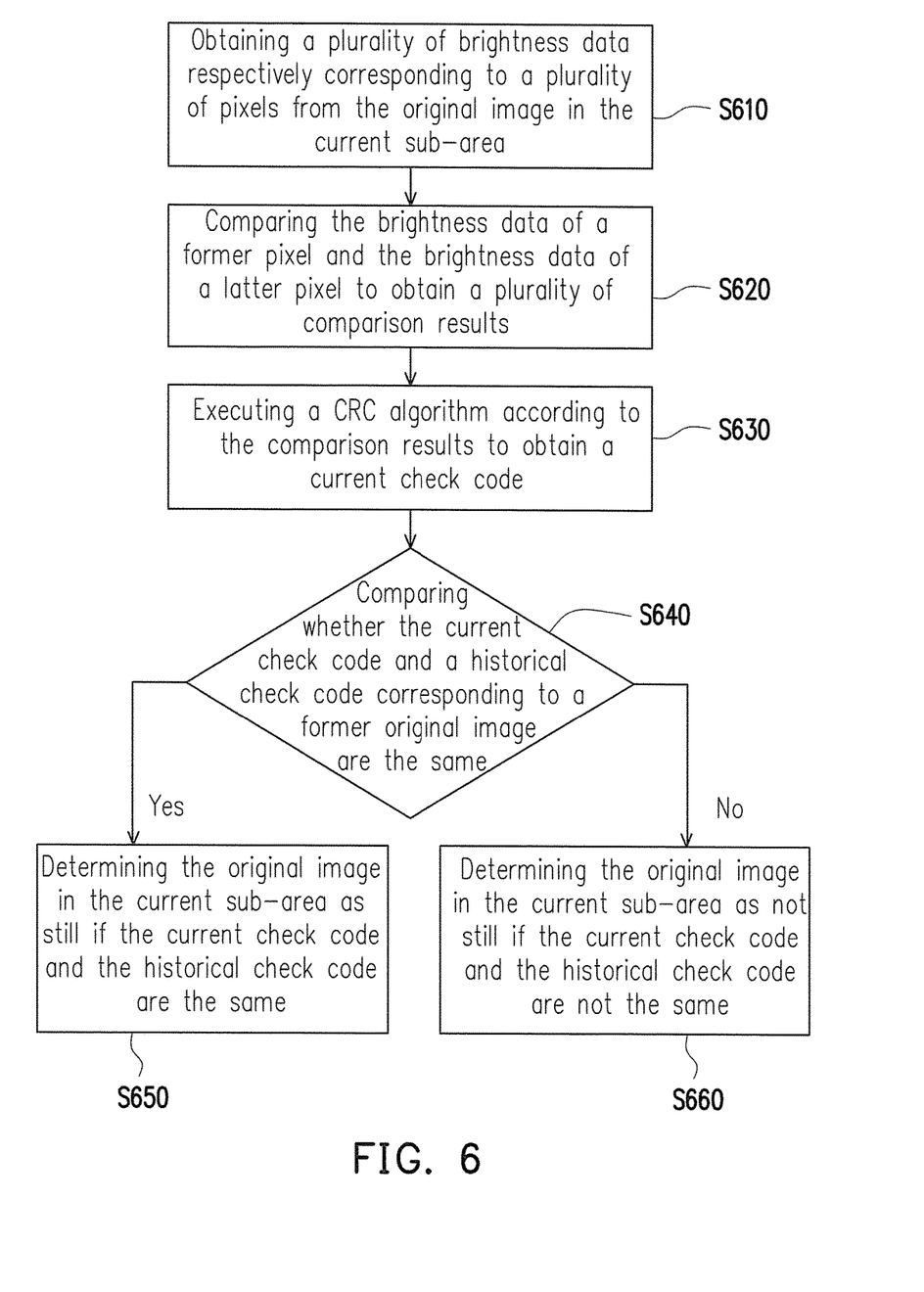
FIG. 6 is a flowchart of the step of determining whether the original image corresponding to each sub-area is still according to the first embodiment of the invention.
Figure 7:
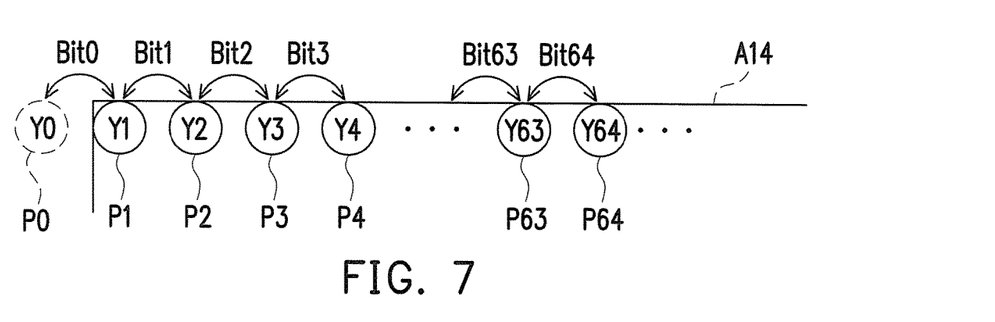
FIG. 7 is a schematic diagram of the step of determining whether the original image corresponding to each sub-area is still according to the first embodiment of the invention.

The "CRC algorithm" used for the step of determining whether the original image corresponding to each sub-area is still in the embodiment of the invention will be described with reference to FIG. 6 and FIG. 7. FIG. 6 is a flowchart of the step of determining whether the original image corresponding to each sub-area is still according to the first embodiment of the invention. FIG. 7 is a schematic diagram of the step of determining whether the original image corresponding to each sub-area is still according to the first embodiment of the invention. Pixels P1 to P64 in FIG. 7 respectively have corresponding brightness data Y1 to Y64 and other data for presenting an image, and herein, the "CRC algorithm" is applied to only the brightness data Y1 to Y64.

Referring to both FIG. 6 and FIG. 7, in step S610, a display controller obtains a plurality of brightness data (e.g., Y1 to Y64) respectively corresponding to a plurality of pixels (e.g., the pixels P1 to P64) from an original image in a current sub-area. In step S620, the display controller compares the brightness data of a former pixel and the brightness data of a latter pixel to obtain a plurality of comparison results. For example, the pixel P1 is the first pixel at an edge of the original image corresponding to the sub-area, and thus, the display controller compares the brightness data Y0 (which is set to 0 by default) of the former virtual pixel P0 with the brightness data Y1 of the latter pixel P1, so as to generate a comparison bit Bit0 to serve as a comparison result. Meanwhile, the display controller compares the brightness data Y1 of the former pixel P1 with the brightness data Y2 of the latter pixel P2, so as to generate a comparison bit Bit1 to serve as a comparison result, and the rest may be derived by analog. It is assumed herein that when the brightness data of the former pixel is greater than the brightness data of the latter pixel, the comparison bit BitX is set to 1, otherwise, the comparison bit BitX is set to 0. Thereby, the display controller may obtain the comparison bits Bit0 to Bit63 to serve as the comparison results from step S620.

In step S630, the display controller executes the CRC algorithm according to the comparison results to obtain a current check code. Since the CRC algorithm has various types, such as CRC32 (employing 32 bits for an input signal) or CRC64 (employing 64 bits for an input signal), and requires less computation quantity when performing the computation, the person applying the present embodiment may select the desired type of CRC algorithm and the number of the corresponding input bits based on the hardware structure or demands. The present embodiment is implemented by CRC64, thus, 64 comparison bits (e.g., Bit0 to Bit63) are employed as a set of input signal for the CRC algorithm, and the current check code of the original image corresponding to the current sub-area is obtained through calculation by the CRC algorithm. If the number of the comparison bits is less than 64, redundancy bits may be filled in the insufficient bits (e.g., by filling in "0") for executing the calculation of the CRC algorithm.

In step S640, the display controller compares whether the current check code and a historical check code corresponding to a former original image are the same. If the current check code and the historical check code are the same (i.e., the determination in step S640 is yes), the display controller enters step S650 to determine the original image in the current sub-area as still. By contrast, if the current check code and the historical check code are not the same (i.e., the determination in step S640 is no), the display controller enters step S660 to determine the original image in the current sub-area as not still/dynamic.

It should be specially mentioned that when the original image in the current sub-area is not still/dynamic, the display controller further sets the current check code to the historical check code in the time period from step S220 to step S240 illustrated in FIG. 2, thereby updating the check code corresponding to the current sub-area.

Figure 8:
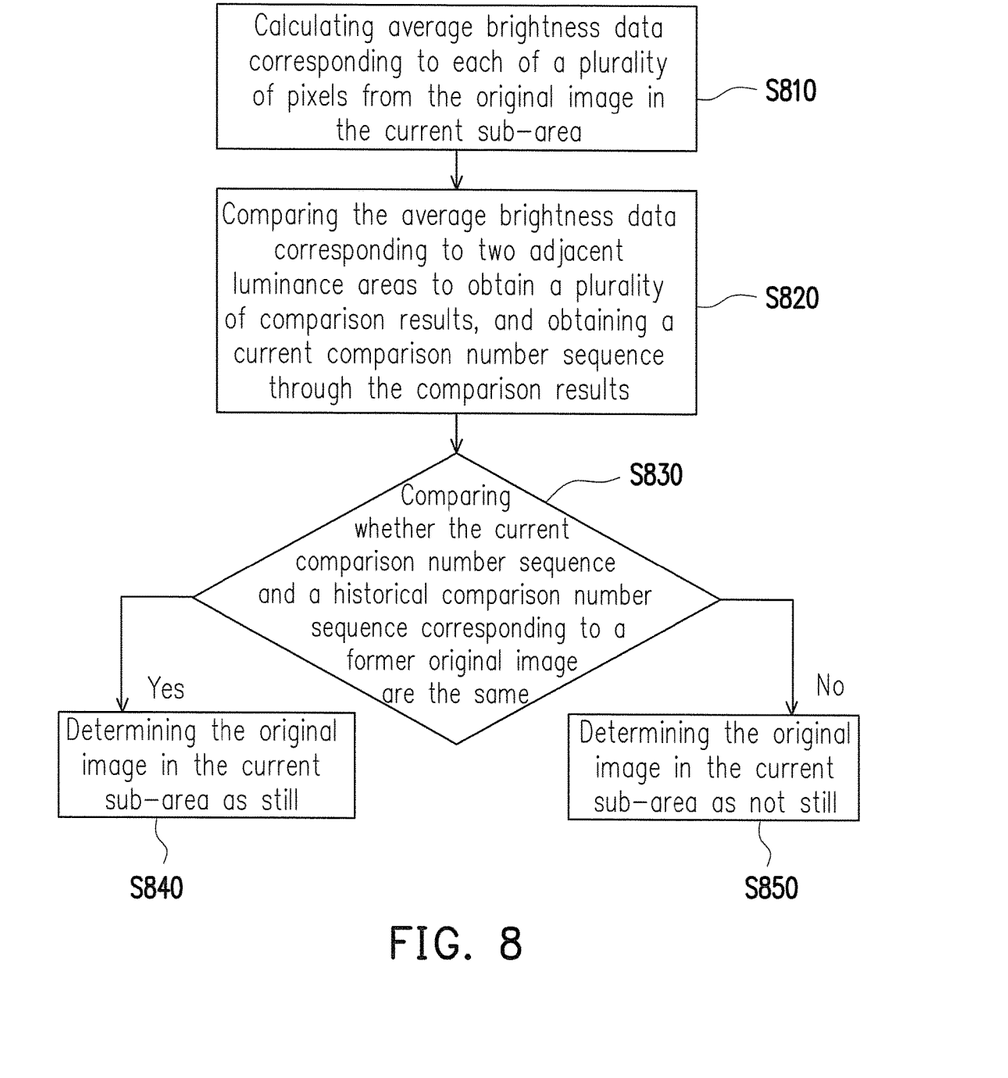
FIG. 8 is another flowchart of the step of determining whether the original image corresponding to each sub-area is still according to the first embodiment of the invention.
Figure 9:
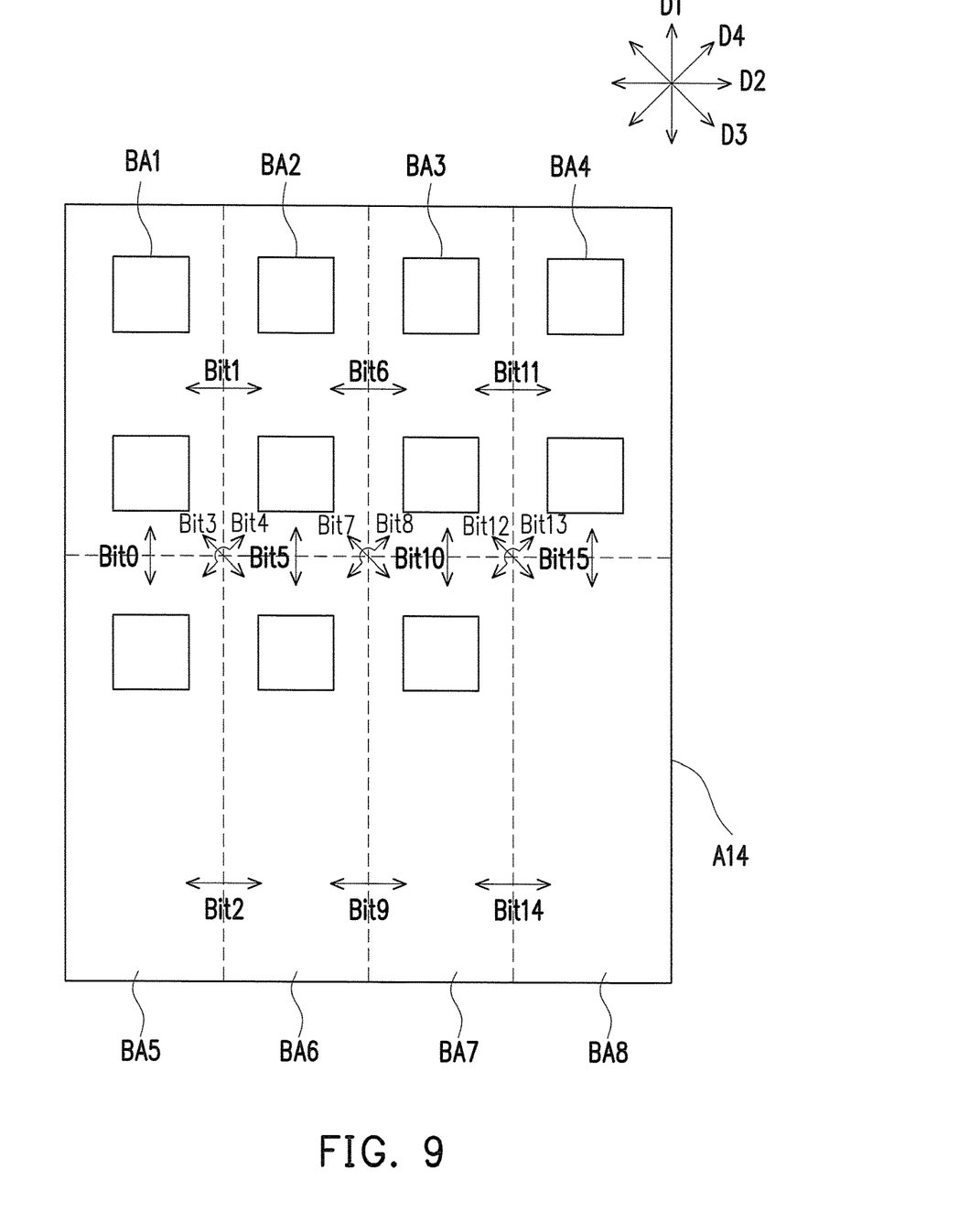
FIG. 9 is another schematic diagram of the step of determining whether the original image corresponding to each sub-area is still according to the first embodiment of the invention.

The "adjacent block luminance averaging algorithm" used for the step of determining whether the original image corresponding to each sub-area is still in the embodiment of the invention will be described with reference to FIG. 8 and FIG. 9. FIG. 8 is another flowchart of the step of determining whether the original image corresponding to each sub-area is still according to the first embodiment of the invention. FIG. 9 is another schematic diagram of the step of determining whether the original image corresponding to each sub-area is still according to the first embodiment of the invention. Referring to FIG. 9, FIG. 9 illustrates that a current sub-area (e.g., the sub-area A14) is averagely divided into multiple (e.g., 8) brightness areas BA1 to BA8.

Referring to both FIG. 8 and FIG. 9, in step S810, the display controller calculates average brightness data YM1 to YM8 respectively corresponding to the each of the brightness areas BA1 to BA8 of the original image in the current sub-area. The average brightness data YM1 to YM8 refers to average values of the brightness data in the pixel data of the original image corresponding to each of the brightness areas BA to BA8.

In step S820, the display controller compares the average brightness data corresponding to two adjacent brightness areas to obtain a plurality of comparison results, and obtains a current comparison number sequence through the comparison results. The "adjacent brightness areas" referred to herein may be adjacent in four manners. The adjacent brightness areas may be horizontally adjacent brightness areas (e.g., along a direction D1), vertically adjacent brightness areas (e.g., along a direction D2) and left and right adjacent brightness areas along diagonal lines (e.g., along directions D3 and D4). The comparison bits Bit0, Bit5, Bit10 and Bit15 are the values obtained by respectively comparing the average brightness data of the adjacent brightness areas (e.g., BA1 and BA5, BA2 and BA6, BA3 and BA7, and BA4 and BA8) along the direction D1. The comparison bits Bit1, Bit6, Bit11, Bit2, Bit9 and Bit14 are the values obtained by respectively comparing the average brightness data of the adjacent brightness areas (e.g., BA1 and BA2, BA2 and BA3, BA3 and BA4, BA5 and BA6, BA6 and BA7, and BA7 and BA8) along the direction D2. The comparison bits Bit3, Bit7 and Bit12 are the values obtained by respectively comparing the average brightness data of the adjacent brightness areas (e.g., BA1 and BA6, BA2 and BA7, and BA3 and BA8) along the direction D3. The comparison bits Bit4, Bit8 and Bit13 are the values obtained by respectively comparing the average brightness data of the adjacent brightness areas (e.g., BA2 and BA5, BA3 and BA6, and BA4 and BA7) along the direction D3. It is assumed herein that when the brightness data of the former adjacent brightness area is more than the brightness data of the latter adjacent brightness area, the comparison bit BitX is set to 1, otherwise, the comparison bit BitX is set to 0. Thereby, the display controller may obtain a current comparison number sequence consisting of the comparison bits Bit0 to Bit63 from step S820. In another embodiment, a part of the adjacent brightness areas may be selectively selected to compare to obtain the comparison bits, so as to save the computation burden of the display controller.

In step S830, the display controller compares whether the current comparison number sequence and a historical comparison number sequence corresponding to a former original image are the same. If the current comparison number sequence and the historical comparison number sequence are the same (i.e., the determination of step S830 is yes), the display controller determines the original image in the current sub-area as still in step S840. By contrast, if the current comparison number sequence and the historical comparison number sequence are not the same (i.e., the determination of step S830 is no), the display controller determines the original image in the current sub-area as not still in step S850.

It should be mentioned that when the original image in the current sub-area is not still, the display controller further sets the current comparison number sequence to the historical comparison number sequence in the time period from step S220 to step S240 illustrated in FIG. 2, thereby updating the brightness comparison sequence corresponding to the current sub-area.

Figure 10:
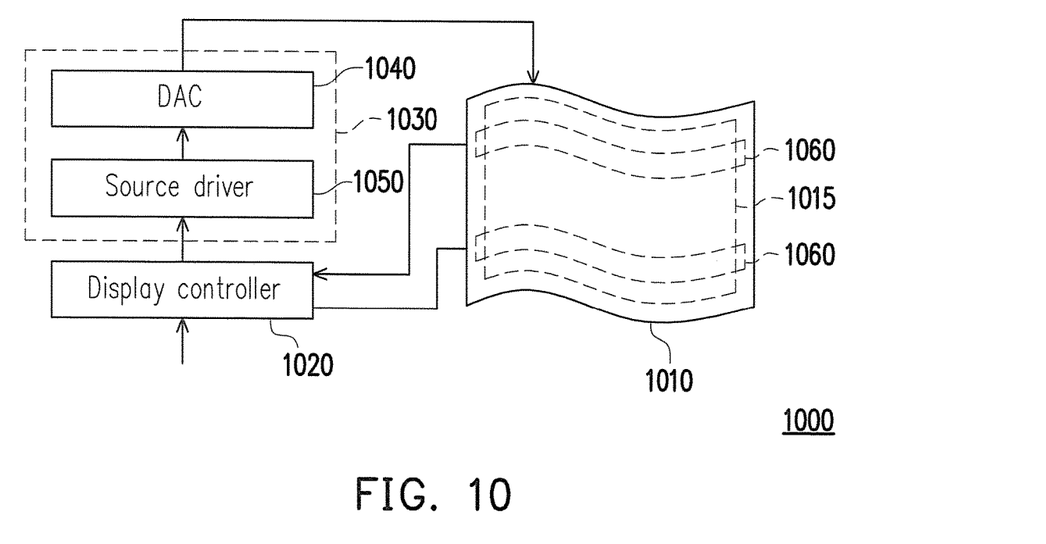
FIG. 10 is a functional block diagram of a display device according to a second embodiment of the invention.

Besides being determined to degrade the processing level corresponding to the image processing scheme according to the duration in which the image is maintained still, the processing level may also be determined to degrade according to a bending degree of the display area, so as to reduce the luminance of the image in a scenario that the display panel is a flexible display panel. FIG. 10 is a functional block diagram of a display device 1000 according to a second embodiment of the invention. Referring to FIG. 10, the display device 1000 includes a display panel 1010, a panel driver 1030, a display controller 1020 and a bending detector 1060. The panel driver 1030 is configured to drive the display panel 1010. The display controller 1020 is coupled to the panel driver 1030 and the bending detector 1060. The panel driver 1030 may include a DAC 1040 and a source driver 1050. The display panel 1010 may be composed of a solid state light source, for example, an organic light emitting diode (OLED) element. It should be specially mentioned that the display panel 1010 is a flexible display panel. The bending detector 1060 is disposed on the flexible display panel 1010, and capable of detecting a bending degree of at least one sub-area of the display area 1015. In the present embodiment, the bending detector 1060 may include at least one resistive film. A resistance of the resistive film varies with a bending degree of the flexible display panel 1010. Thus, the display controller 1020 may determine the bending degree of each sub-area according to resistance variation of the resistive film in the bending detector 1060.

The sub-areas of the display area 1015 may be divided according to arrangement positions of the resistive films in the bending detector 1060. For example, each resistive film may be arranged a position corresponding to each sub-area, such that the display area 1020 may obtain the bending degree of each sub-area.

Figure 11:
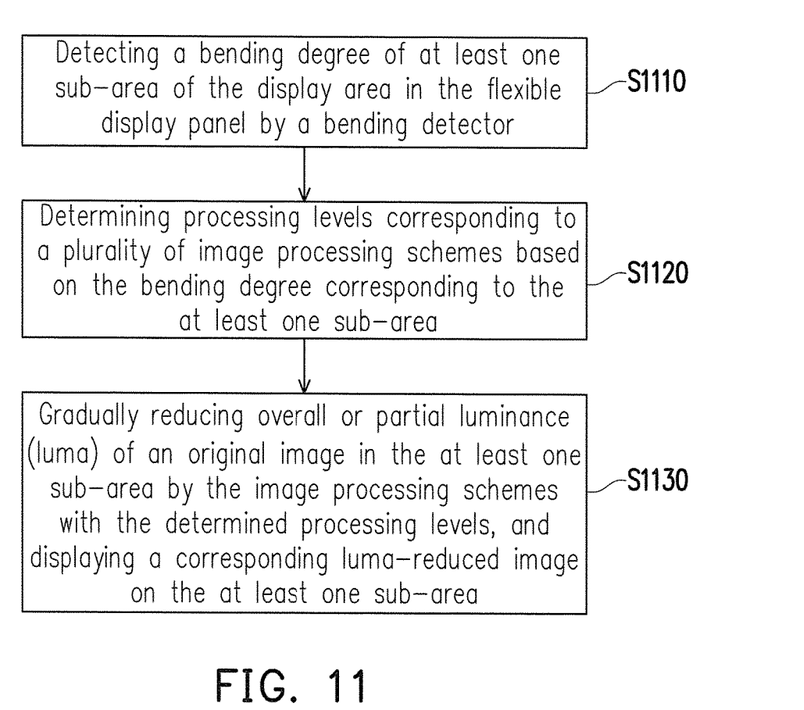
FIG. 11 is a flowchart of an image processing method according to the second embodiment of the invention.

FIG. 11 is a flowchart of an image processing method according to the second embodiment of the invention. The image processing method illustrated in FIG. 11 is adapted to the display device 1000 including the flexible display panel 1010 illustrated in FIG. 10. Referring to both FIG. 10 and FIG. 11, in step S1110, the display controller 1050 may detect a bending degree of at least one sub-area of the display area 1015 in the flexible display panel 1010 by the bending detector 1060. In step S1120, the display controller 1050 determines processing levels corresponding to a plurality of image processing schemes based on the bending degree corresponding to each sub-area. The image processing schemes referred to herein may include the monochromatic filtering algorithm in the image intensifier, the edge smooth algorithm in the edge smooth processor and the luminance reduction algorithm in the luminance adjuster, but the invention is not limited to the algorithms. When the bending degree corresponding to each sub-area increases, image luminance in each sub-area may be dramatically reduced. Descriptions with respect to the image processor and the image processing schemes may refer to each embodiment described above. In step S1130, the display controller 1050 gradually reduces overall or partial luminance (luma) of an original image in the sub-area by the image processing schemes with the determined processing levels, and a corresponding luma-reduced image is displayed on the current sub-area.

Figure 12:
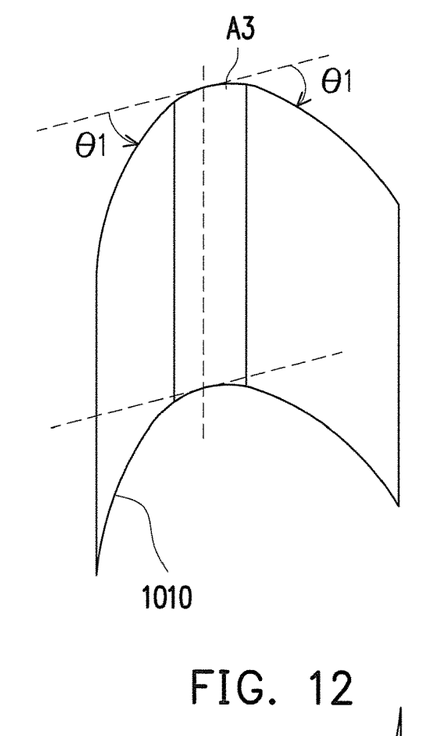
FIG. 12 and FIG. 13 are schematic diagrams illustrating bending states of the flexible display panel according to the second embodiment of the invention.
Figure 13:
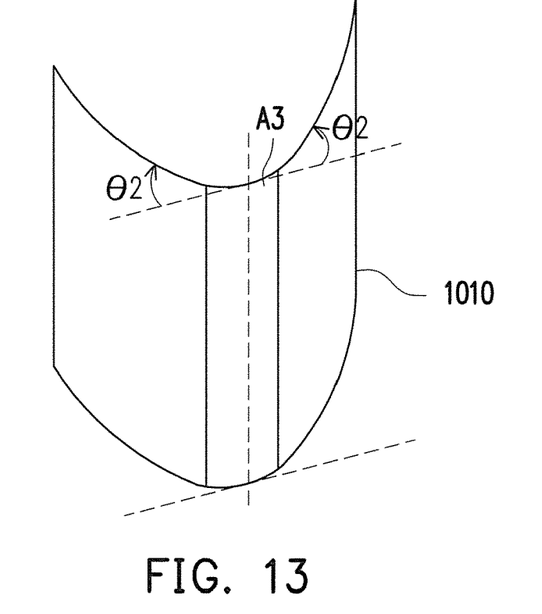

FIG. 12 and FIG. 13 are schematic diagrams illustrating bending states of the flexible display panel 1010 according to the second embodiment of the invention. FIG. 12 illustrates a situation that the flexible display panel 1010 is bent outward, and in this case, an included angle of a sub-area A3 with respect to a plane which is not bent is θ1. The display controller 1020 illustrated in FIG. 10 may detect the included angle θ1 by using the bending detector 1010 to serve as a bending degree of the sub-area A3. FIG. 13 illustrates a situation that the flexible display panel 1010 is bent inward, and in this case, an included angle of the sub-area A3 with respect to the plane which is not bent is θ2. The display controller 1020 illustrated in FIG. 10 may detect the included angle θ2 by using the bending detector 1010 to serve as another bending degree of the sub-area A3. Since the user does not especially pay attention to the luminance of the image displayed on the sub-area A3 having an excessively large bending degree (or referred to as bending angle) when viewing the flexible display panel 1010, the display controller 1020 of the invention may accordingly reduce the overall or partial luminance of the original image of the sub-area with the greater bending degree, so as to extend a lifetime of the flexible display panel 1010.

Based on the above, in the image processing method and the display device using the same provided by the invention, the processing levels corresponding to the image processing schemes can be determined according to whether the image on the display area is still or the bending degree of the flexible display area, and the luminance for driving the light emitting element (e.g., the blue OLED element) in the display panel can be reduced by the image processing scheme with the determined processing level. If the luminance of the still image decreases gradually as the duration in which the image is maintained still increases, it is difficult for the user to perceive. Additionally, in the scenario of the flexible display panel, the user does not especially pay attention to the image displayed on the display area having an excessively large bending degree (or referred to as bending angle). Thus, the image processing method of the invention tends to gradually reduce the luminance according to the duration in which the image is maintained still or the bending degree of the display area, which can prevent the user from perceiving the reduction of the luminance of the image. In this way, the current density of the light emitting elements on the display panel can be effectively reduced, such that the decay speed of the luminance of the light emitting elements can be mitigated, and the lifetimes of light emitting elements and the display panel using light emitting elements can be extended.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. An image processing method, adapted to a display panel with a display area, the method comprising:
   analyzing a plurality of original images to be displayed on a plurality of sub-areas in the display area, and determining whether the original image corresponding to each of the sub-areas is still;
   when the original image in a current sub-area is determined as still, recording a time length of the original image being still, wherein the current sub-area is one of the sub-areas;
   determining processing levels corresponding to a plurality of image processing schemes based on the time length; and
   reducing overall or partial luminance (luma) of the original image in the current sub-area by the image processing schemes with the determined processing levels, and displaying a corresponding luma-reduced image on the current sub-area.

2. The image processing method according to claim 1, wherein the image processing schemes comprises a luminance reduction algorithm, an edge smooth algorithm and a monochromatic filtering algorithm.

3. The image processing method according to claim 2, wherein a luminance value corresponding to the current sub-area reduced by the luminance reduction algorithm is determined to serve as the processing level according to the time length,
   wherein the luminance value is increasingly reduced as the time length increases.

4. The image processing method according to claim 2, wherein a luma-reduction degree of adjacent sub-pixels next to a sub-pixel reduced by the edge smooth algorithm is determined to serve as the processing level according to the time length,
   wherein a diffusion ratio of the sub-pixel diffusing the luminance thereof to the adjacent sub-pixels is less than or equal to 50%.

5. The image processing method according to claim 2, wherein a luminance value corresponding to a first color in the still original image reduced by the monochromatic filtering algorithm is determined to serve as the processing level according to the time length.

6. The image processing method according to claim 1, wherein the step of determining whether the original image corresponding to each of the sub-areas is still comprises:
   obtaining a plurality of brightness data respectively corresponding to a plurality of pixels from the original image in the current sub-area;
   comparing the brightness data of a former pixel and the brightness data of a latter pixel to obtain a plurality of comparison results;
   executing a cyclic redundancy check (CRC) algorithm according to the comparison results to obtain a current check code;
   comparing whether the current check code and a historical check code corresponding to a former original image are the same;
   determining the original image in the current sub-area as still if the current check code and the historical check code are the same; and
   determining the original image in the current sub-area as not still if the current check code and the historical check code are not the same.

7. The image processing method according to claim 6, further comprising:
   when the original image in the current sub-area is determined as not still, resetting the time length corresponding to the current sub-area, and setting the current check code to the historical check code.

8. The image processing method according to claim 1, wherein the step of determining whether the original image corresponding to each of the sub-areas is still comprises:
   calculating average brightness data corresponding to each of a plurality of pixels from the original image in the current sub-area;
   comparing the average brightness data corresponding to two adjacent luminance areas to obtain a plurality of comparison results, and obtaining a current comparison number sequence through the comparison results;
   comparing whether the current comparison number sequence and a historical comparison number sequence corresponding to a former original image are the same;
   determining the original image in the current sub-area as still if the current comparison number sequence and the historical comparison number sequence are the same; and
   determining the original image in the current sub-area as not still if the current comparison number sequence and the historical comparison number sequence are not the same.

9. The image processing method according to claim 8, further comprising:
   when the original image in the current sub-area is determined as not still, resetting the time length corresponding to the current sub-area, and setting the current comparison number sequence to the historical comparison number sequence.

10. The image processing method according to claim 1, further comprising:
    dividing the sub-areas according to functions presented in different positions of the display area.

11. A display device, comprising:
    a display panel, comprising a display area;
    a panel driver, coupled to and driving the display panel; and
    a display controller, coupled to the panel driver, analyzing a plurality of original images to be displayed on a plurality of sub-areas in the display area, determining whether the original image corresponding to each of the sub-areas is still, and records a time length of the original image being still when the original image in a current sub-area is determined as still, wherein the current sub-area is one of the sub-areas, the display controller determines processing levels corresponding to a plurality of image processing schemes based on the time length, reduces overall or partial luminance (luma) of the original image in the current sub-area by the image processing schemes with the determined processing levels, and displays a corresponding luma-reduced image on the current sub-area.

12. The display device according to claim 11, wherein the image processing schemes comprises a luminance reduction algorithm, an edge smooth algorithm and a monochromatic filtering algorithm.

13. The display device according to claim 12, wherein the display controller determines a luminance value corresponding to the current sub-area reduced by the luminance reduction algorithm to serve as the processing level according to the time length,
wherein the luminance value is increasingly reduced as the time length increases.

14. The display device according to claim 12, wherein the display controller determines a luma-reduction degree of adjacent sub-pixels next to a sub-pixel reduced by the edge smooth algorithm to serve as the processing level according to the time length,
wherein a diffusion ratio of the sub-pixel diffusing the luminance thereof to the adjacent sub-pixels is less than or equal to 50%.

15. The display device according to claim 12, wherein the display controller determines a luminance value corresponding to a first color in the still original image reduced by a blue-light filter algorithm to serve as the processing level according to the time length.

16. The display device according to claim 11, wherein the display controller obtains a plurality of brightness data respectively corresponding to a plurality of pixel data from the original image in the current sub-area, compares the brightness data of a former pixel and the brightness data of a latter pixel to obtain a plurality of comparison results, executes a cyclic redundancy check (CRC) algorithm to obtain a current check code, compares whether the current check code and a historical check code corresponding to a former original image are the same, determines the original image in the current sub-area as still if the current check code and the historical check code are the same, and determines the original image in the current sub-area as not still if the current check code and the historical check code are not the same.

17. The display device according to claim 16, wherein when the original image in the current sub-area is determined as not still, the display controller resets the time length corresponding to the current sub-area, and sets the current check code to the historical check code.

18. The display device according to claim 11, wherein the display controller calculates average brightness data corresponding to each brightness area in the original image in the current sub-area, compares the average brightness data corresponding to two adjacent brightness areas to obtain a plurality of comparison results, obtains a current comparison number sequence through the comparison results, compares whether the current comparison number sequence and a historical comparison number sequence corresponding to a former original image are the same,
determines the original image in the current sub-area as still if the current check code and the historical check code are the same, and determines the original image in the current sub-area as not still if the current comparison number sequence and the historical comparison number sequence are not the same.

19. The display device according to claim 18, wherein when the original image in the current sub-area is determined as not still, the display controller resets the time length corresponding to the current sub-area, and sets the current comparison number sequence to the historical comparison number sequence.

* * * * *